United States Patent [19]

Suwandhaputra

[11] Patent Number: 5,535,265
[45] Date of Patent: Jul. 9, 1996

[54] METHOD AND CIRCUITRY FOR CONTROLLING VOICE MAIL, CALL LOGGING AND CALL BLOCKING FUNCTIONS USING A MODEM

[75] Inventor: Johannes H. Suwandhaputra, Fort Worth, Tex.

[73] Assignee: AST Research, Inc., Irvine, Calif.

[21] Appl. No.: 152,837

[22] Filed: Nov. 15, 1993

[51] Int. Cl.$^6$ .................................................. H04M 11/00
[52] U.S. Cl. ............................. 379/97; 379/98; 379/199; 379/114; 379/140
[58] Field of Search ......................... 379/97, 98, 96, 379/94, 93, 106, 107, 142, 133, 140, 199, 200, 95, 114

[56] References Cited

U.S. PATENT DOCUMENTS

| | | | |
|---|---|---|---|
| 4,304,968 | 12/1981 | Klausner et al. | 379/142 |
| 4,924,496 | 5/1990 | Figa et al. | 379/142 |
| 4,958,371 | 9/1990 | Damoci et al. | 379/107 |
| 4,993,062 | 2/1991 | Dula et al. | 379/98 |
| 5,054,055 | 10/1991 | Hanle et al. | 379/142 |
| 5,077,786 | 12/1991 | Hashimoto | 379/100 |
| 5,134,650 | 7/1992 | Blackmon | 379/107 |
| 5,343,516 | 8/1994 | Callele et al. | 379/98 |
| 5,349,638 | 9/1994 | Pitroda et al. | 379/98 |
| 5,351,287 | 9/1994 | Bhattacharyya et al. | 379/95 |

*Primary Examiner*—Curtis Kuntz
*Assistant Examiner*—Stella L. Woo
*Attorney, Agent, or Firm*—Knobbe, Martens, Olson & Bear

[57] ABSTRACT

A telephone line monitoring circuit for a MODEM monitors the TIP and RING lines of the telephone line. A first circuit of the monitoring circuit detects when a local phone goes off-hook while the MODEM is on-hook by sensing a decrease in a differential voltage between the TIP and RING lines. A second circuit detects the pick up of a local phone while the MODEM is off-hook by detecting a change in the impedance between the TIP and RING lines. A third circuit detects the hang up of a remote phone connected with the MODEM while the MODEM is off-hook by detecting a temporary break in the DC loop between the central office and MODEM. A snoop circuit monitors the telephone line for DTMF signals while the MODEM is on-hook. The snoop circuit becomes AC coupled to the telephone line when enabled, and does not apply a significant load to the telephone line. The monitoring circuit permits a processor to control a variety of call-related functions, including the recording of incoming voice mail messages, the logging of incoming and outgoing calls, and the blocking of outgoing calls to specified telephone numbers.

14 Claims, 6 Drawing Sheets

METHOD AND CIRCUITRY FOR CONTROLLING VOICE MAIL, CALL LOGGING AND CALL BLOCKING FUNCTIONS USING A MODEM

FIELD OF THE INVENTION

This invention relates to MODEMS and related devices for communicating over a telephone line. In particular, this invention relates to certain features that permit a MODEM to perform a variety of voice mail, call logging and call blocking functions.

BACKGROUND OF THE INVENTION

A MODEM is a circuit that uses digital data to modulate and demodulate a carrier wave so that digital data can be transmitted over an analog telephone network. MODEMs are commonly used to transfer data between personal computers. The MODEM is typically in the form of a circuit board that plugs into an internal slot of a personal computer, and communicates with the processor of the computer over a standard bus. A phone line is plugged into a phone jack residing on the circuit board. Alternatively, a MODEM may be a stand-alone device that communicates with a personal computer via a serial communications port.

It has recently become common to add facsimile ("fax") capabilities to MODEMs to allow users of the personal computer to send and receive faxes. With the increase in processor speeds and storage capacities of personal computers experienced over the last decade, it has also become feasible to use a personal computer for voice mail purposes. To record a voice message from a remote caller, the MODEM uses an analog-to-digital converter to digitize the voice message. The digitized message can then be stored in computer memory or on a storage device for later recall.

Unfortunately, the existing MODEM technology is not well-suited for voice mail purposes. MODEM chip-sets typically determine whether or not the remote caller has hung up the phone by monitoring the telephone line for frequency differentiation in the form of silent energy, dial tone energy and DTMF (dual tone multi-frequency) energy. This method of detecting the remote hang up tends to be unreliable for two reasons. First, the telephone line is often too noisy to detect the frequency differentiation. Second, the central telephone switching office typically does not immediately respond with a dial tone after the remote caller hangs up. For these two reasons, the MODEM often does not detect the remote hang up for 10 to 20 seconds or longer, during which time the computer unnecessarily continues to store digitized data. Thus, an improved circuit and method for detecting a remote caller hang up is needed.

To use a computer and MODEM for voice mail purposes it is also important to be able to detect when a phone local to the MODEM has been taken off-hook. For example, if the MODEM has answered an incoming call and is in the process of playing an outgoing voice mail message (or recording an incoming voice mail message), it is desirable terminate the process as soon as a local phone has been picked up. Existing MODEM chip-sets do not provide for local pick up detection, and thus do not permit the incoming or outgoing recording process to be terminated upon local pick up. A method for detecting the pick up of a local phone when the MODEM is off-hook is therefore needed.

Finally, existing MODEM technology does not permit the, MODEM to monitor events occurring locally on the phone line without the MODEM going off-hook. For example, the MODEM cannot detect whether or not a local phone is off-hook, and cannot monitor the placement of calls made from local phones. The addition of such capabilities would allow the computer to perform a variety of call monitoring, call logging and call blocking functions that are not currently possible.

The present invention is directed toward a solution to the preceding problems. The following terminology will be helpful for understanding the present invention. "Local phone" refers to a telephone that is connected to the same telephone number or extension as the subject MODEM. "Remote phone" refers to a telephone at a different telephone number or extension from the subject MODEM. "Central office" refers to a telephone switching office to which the subject MODEM is connected. "On-hook" refers to a state of a telephone, MODEM or other device in which the DC loop connecting the device to the central office is placed in an open condition. "Off-hook" refers to a state of a telephone, MODEM or other device in which the DC loop connecting the device to the central office is placed in closed condition (as commonly occurs when the telephone handset is removed from its holder). Finally, "called party control" refers generally to the process of determining whether or not a local or remote phone has been taken off-hook and acting accordingly.

SUMMARY OF THE INVENTION

The present invention relates to circuitry and methods for allowing a computer having a MODEM to perform various voice mail, call logging and call blocking functions.

In particular, the present invention involves two MODEM features. The first such feature involves the generation of three status bits by the MODEM for indicating a variety of "on-hook" and "off-hook" conditions. The status bits can be used individually or in combination by software to control a variety call-related functions.

The first status bit is the LOCAL PHONE OFF-HOOK bit. This active-high status bit indicates whether or not a local phone is presently off-hook. The bit is meaningful only when the MODEM is in the on-hook condition. The LOCAL PHONE OFF-HOOK bit is generated by a circuit that detects a change in the voltage differential between the TIP and RING lines whenever a local phone goes on-hook or off-hook while the MODEM is on-hook. The LOCAL PHONE OFF-HOOK bit is useful for a variety of purposes. For example, the bit can be used by software to perform call logging functions, wherein the computer keeps track of the time and duration of calls placed from a local phone.

The second status bit is the REMOTE HANG UP bit. This status bit is meaningful only when the MODEM is off-hook, and indicates that the remote phone with which the MODEM was connected has been hung up. The bit is generated by a circuit which detects a temporary break (approximately 250 milliseconds) in the DC loop between the central office and MODEM. The temporary break is generated by the central office when the remote phone is placed in the on-hook condition.

The REMOTE HANG UP bit can be used, for example, to immediately stop the MODEM from recording an incoming voice mail message once the calling party hangs up. This provides a significant advantage over systems that wait for a dial tone or other DTMF signal before terminating the recording. The recording process is terminated almost immediately after the remote party hangs up, thus preventing the computer from storing unwanted data.

The third status bit is the LOCAL PICK UP bit. This active-high bit is set when the MODEM is currently off-hook and a local phone is picked up, and is meaningful only when the MODEM is off-hook. The bit is generated by a circuit that detects a change of impedance which results when a local phone goes off-hook. The bit can be used, for example, to stop an outgoing voice mail message once a local phone has been picked up.

The second feature of the present invention is a "DTMF SNOOP" circuit. The DTMF SNOOP circuit advantageously permits the MODEM to monitor DTMF signals present on the phone line without going off-hook, and without placing a significant load on the phone line. Software enables the DTMF SNOOP function by sending a DTMF SNOOP command to the MODEM. The MODEM responds by closing a relay which AC couples the DTMF SNOOP circuit to the phone line.

The DTMF SNOOP circuit is useful for a variety of functions. For example, when used in conjunction with the LOCAL PHONE OFF-HOOK bit, the circuit permits software to maintain a record of all calls placed from a local phone, including the telephone numbers dialed and the duration of each call. The DTMF SNOOP circuit can also be used for recording caller ID information, and for performing call blocking functions.

Figure 1:
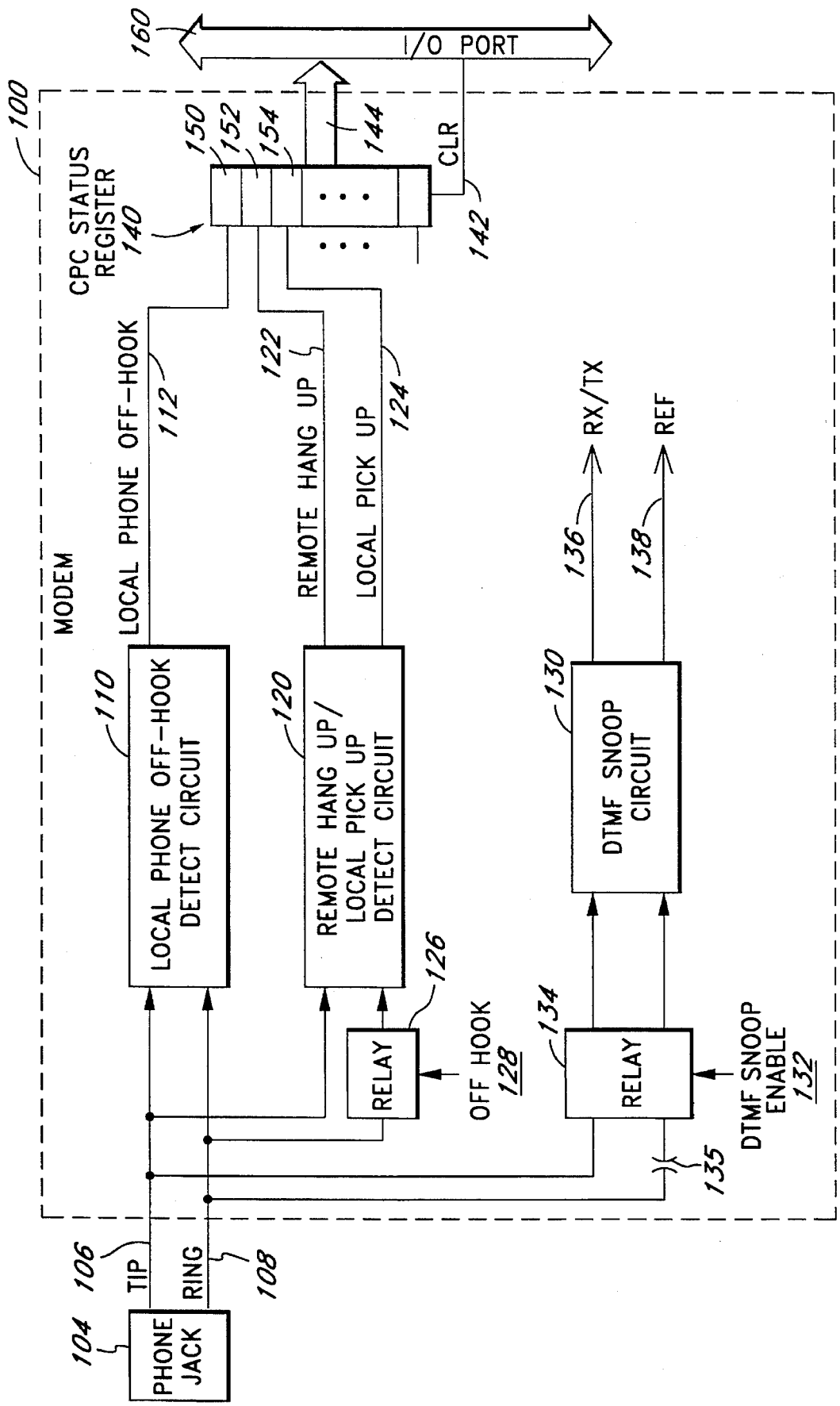
FIG. 1 is a high level diagram of the MODEM circuitry of the present invention for controlling a variety of voice mail, call logging and call blocking functions.

In the drawings, the first digit of a reference number identifies the figure in which the element first appears.

DETAILED DESCRIPTION OF THE PREFERRED EMBODIMENT

FIG. 1 is a high level block diagram of the MODEM circuitry of the present invention. A MODEM 100 is connected to a phone jack 104 via the TIP and RING lines 106, 108 of a telephone line. The TIP and RING lines are used as inputs to a LOCAL PHONE OFF-HOOK detect circuit 110, which generates a logic signal LOCAL PHONE OFF-HOOK on the line 112. The TIP and RING lines 106, 108 are additionally used as inputs to a REMOTE HANG UP/LOCAL PICK UP detect circuit 120, which generates a logic signal REMOTE HANG UP on the line 122, and a logic signal LOCAL PICK UP on the line 124.

Figure 5:
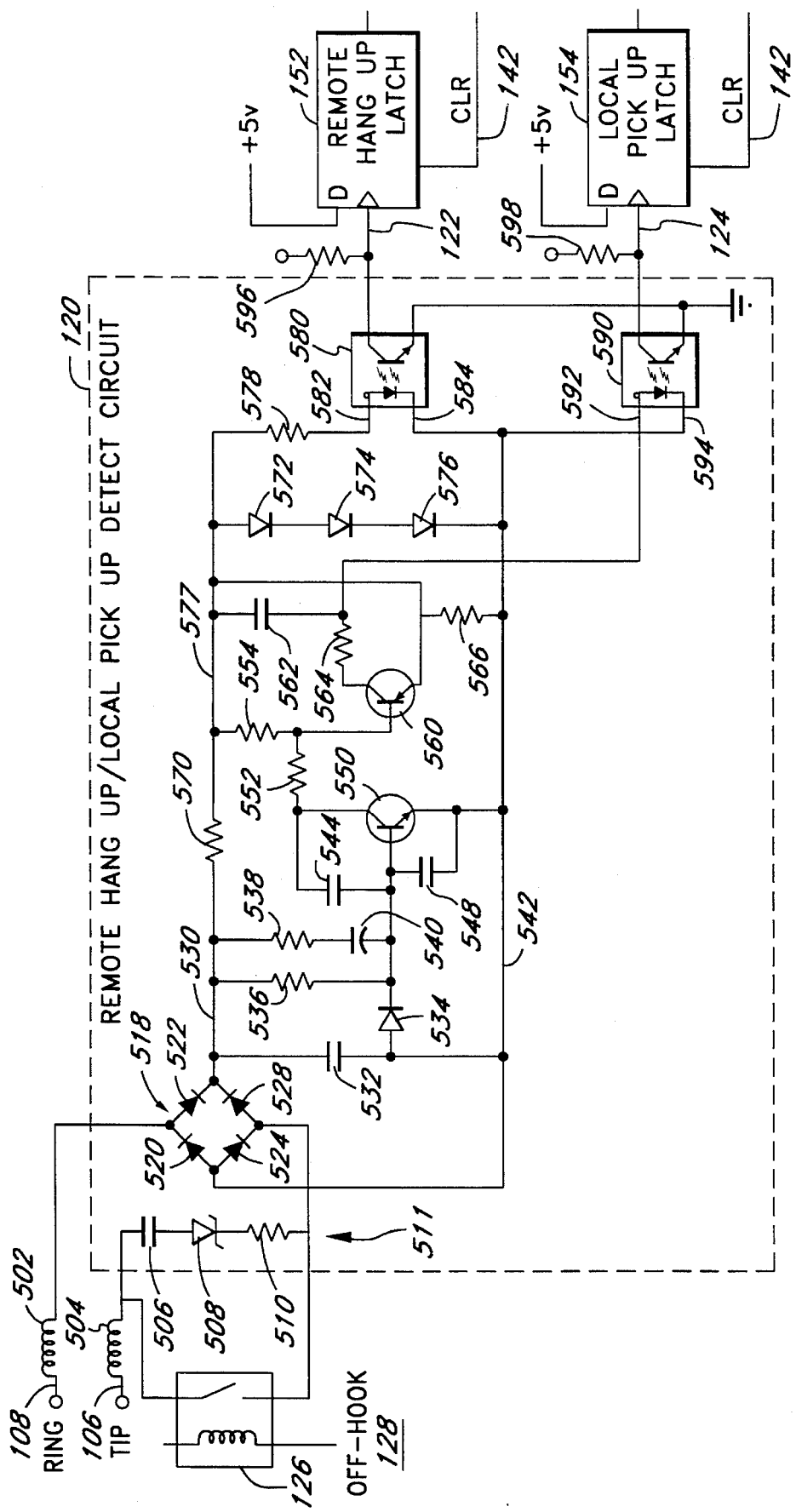
FIG. 5 is a schematic diagram of the REMOTE HANG UP/LOCAL PICK UP detect circuit of FIG. 1.

A called party control status register 140 (hereinafter CPC status register) contains individual single bit latches 150, 152, 154 corresponding to the signals LOCAL PHONE OFF-HOOK, REMOTE HANG UP and LOCAL PICK UP on the lines 112, 122 and 124 respectively. The REMOTE HANG UP line 122 and the LOCAL PICK UP line 124 are connected as clock inputs to the latch 152 and the latch 154 respectively. The data inputs of the latch 152 and the latch 154 are tied high (FIG. 5). The LOCAL PHONE OFF-HOOK line 112 is connected as a data input to the clocked latch 150 (clock input not shown). Alternatively, the latch 150 can be replaced by a tri-state buffer. The CPC status register 140 can have additional latches as shown for providing other status information to the processor.

The CPC status register 140 is connected to an I/O port 160 by a unidirectional bus 144, allowing a processor (not shown) to read the contents of the CPC status register. The CPC status register 140 has a CLR input signal 142 that connects to the I/O port 160, allowing the processor to clear the latches 150, 152, 154.

The RING line 108 is connected to the REMOTE HANG UP/LOCAL PICK UP detect circuit 120 through a relay 126. The relay 126 has an OFF-HOOK control input 128. The TIP and RING lines 106, 108 are also connected to a DTMF SNOOP circuit 130 through a capacitor 135 and a relay 134. The relay 134 has a DTMF SNOOP ENABLE control input 132. The DTMF SNOOP circuit 130 has two outputs RX/TX and REF on the lines 136, 138.

The circuit of FIG. 1 provides two general features, both of which enable significant control by software over the voice mail, call logging and call blocking features offered by the MODEM 100. The first feature involves the generation of the status signals LOCAL PHONE OFF-HOOK, REMOTE HANG UP and LOCAL PICK UP on the lines 112, 122 and 124 respectively. These status signals are latched as CPC status bits by the latches 150, 152, 1.54 of the CPC status register 140, and can be read by the processor of the computer via the bus 144 and I/O port 160.

When the REMOTE HANG UP line 122 goes high, a logic high value is clocked into the latch 152. Similarly, when the LOCAL PICK UP line 124 goes high, a logic high value is clocked into the latch 154. These status bits held by the latches 152, 154 remain high until the CLR line 142 is made active by the processor.

The status bit held by the latch 150 directly tracks the status of the LOCAL PHONE OFF-HOOK signal on the line 112. A high value on the LOCAL PHONE OFF-HOOK line 112 results in a high logic value being clocked into the latch 150, and a low value on the LOCAL PHONE OFF-HOOK line 112 results in a low logic value being clocked into the latch 150. Thus, the latch 150 does not have to be cleared by the processor once the bit becomes set.

The processor can monitor the on-hook and off-hook conditions of local and remote phones by reading the CPC status register 140. Software can thereby control a variety of call-related functions. The processor can clear the CPC status register 140 by writing to a selected I/O address to thereby activate the CLR input signal 142. The details of writing to an I/O address are well known and are not important to the present invention.

The second feature of the circuit of FIG. 1 involves the DTMF SNOOP circuit 130, which advantageously permits the MODEM to monitor DTMF and other signals present on the phone line without going off-hook, and without placing a significant load on the phone line. The DTMF SNOOP circuit 130 is enabled by the processor by activating the DTMF SNOOP ENABLE signal 132. The DTMF SNOOP ENABLE signal is made active by performing an I/O write to a predetermined I/O address, the details of which are not important to the present invention. Once the DTMF SNOOP ENABLE has been made active, the relay 134 closes, and TIP and RING signals on the lines 106, 108 are fed as inputs to the DTMF SNOOP circuit 130. The DTMF SNOOP circuit uses a transformer (FIG. 6) to monitor DTMF signals appearing on the TIP and RING lines while the MODEM is in the on-hook state.

A high level description will initially be given of the CPC status bit and DTMF SNOOP features of the present invention, with reference being made to some of the call-related functions that can be performed by software using these two features. Exemplary embodiments of the LOCAL PHONE OFF-HOOK detect circuit 110, REMOTE HANG UP/LOCAL PICK UP detect circuit 120 and DTMF SNOOP circuit 130 will then be described.

The first of the three status bits generated by the circuit of FIG. 1 is the LOCAL PHONE OFF-HOOK bit stored in the latch 150. This status bit is generated from the signals on the TIP and RING lines 106, 108 by the LOCAL PHONE OFF-HOOK detect circuit 110, which detects a change in the voltage differential between the TIP and RING lines whenever a local phone goes on-hook or off-hook. The LOCAL PHONE OFF-HOOK bit is set high when the MODEM is currently on-hook and a local phone goes off-hook. The LOCAL PHONE OFF-HOOK bit latch 150 is cleared when the MODEM is currently on-hook and a local phone goes on-hook.

The state of the LOCAL PHONE OFF-HOOK bit held by the latch 150 can be used by software for call logging purposes. By periodically sampling the LOCAL PHONE OFF-HOOK bit, software can maintain a record of the times and durations during which a local phone is placed in the off-hook condition. As will be discussed below, the LOCAL PHONE OFF-HOOK bit can be used in conjunction with the DTMF SNOOP feature to permit logging of phone numbers called from a local phone in addition to the duration of each call.

The second status bit generated by the circuit of FIG. 1 is the REMOTE HANG UP bit held by the latch 152. This active-high status bit indicates that the remote party to which the MODEM was connected has hung up. The REMOTE HANG UP/LOCAL PICK UP detect circuit 120 sets this bit when it detects a temporary break (approximately 250 milliseconds) in the DC loop between the central office and MODEM. The temporary break is generated by the central office when the remote phone is placed in the on-hook condition. The REMOTE HANG UP bit permits software to very quickly stop the MODEM from recording an incoming voice mail message once the calling party hangs up. Unlike prior art systems the wait for a dial tone or other DTMF signal as an indication that the remote party has hung up, the system can stop storing voice data to the storage device within a very short time (e.g.—less than five seconds) after remote hang up. Thus, memory is not unnecessarily wasted.

The third status bit generated by the circuit of FIG. 1 is the LOCAL PICK UP bit held by the latch 154. The REMOTE HANG UP/LOCAL PICK UP detect circuit 120 sets this bit if a local phone is picked up while the MODEM is in the off-hook condition. The circuit 120 generates the LOCAL PICK UP signal on the line 124 by detecting a change of impedance which results when a local phone goes off-hook while the MODEM is off-hook. The signal is used to clock the latch 154, and thus store the status bit. The bit can be used, for example, to stop an outgoing voice mail message once a local phone has been picked up.

To fully understand the purpose of the LOCAL PHONE OFF-HOOK detect circuit 110 and REMOTE HANG UP/LOCAL PICK UP detect circuit 120, it is important to recognize that the LOCAL PHONE OFF-HOOK circuit 110 operates while the MODEM is on-hook, and the REMOTE HANG UP/LOCAL PICK UP detect circuit 120 operates while the MODEM is off-hook.

Figure 2:
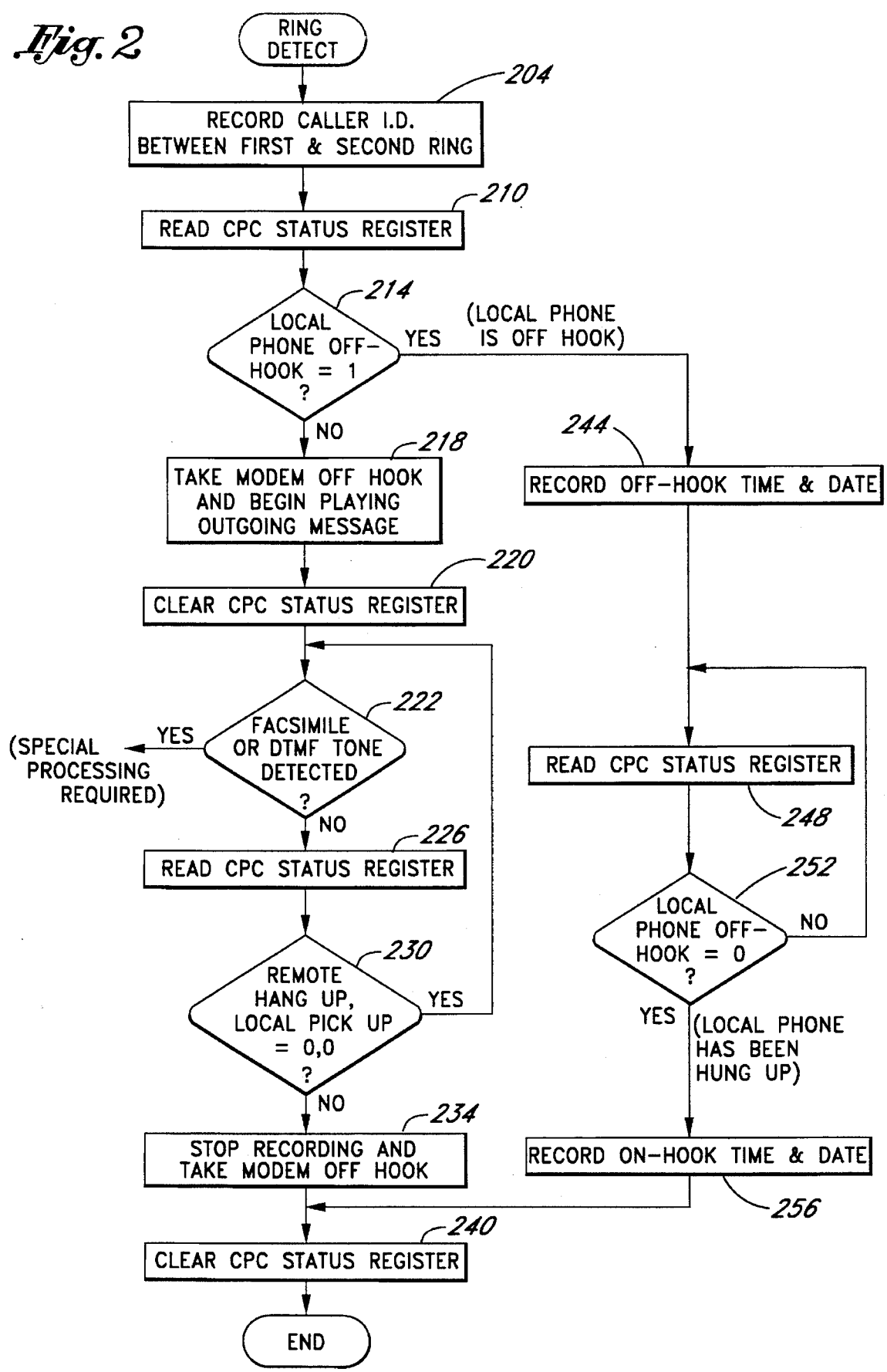
FIG. 2 is a flow chart of an exemplary program showing how the CPC status bits and DTMF SNOOP circuit can be used to control an incoming-call-logging/voice mail application.

A voice mail/call logging application for the circuit of FIG. 1 will now be described. FIG. 2 illustrates a flowchart for an exemplary software routine that can be called when the computer is placed in a voice mail/call logging mode and a ring signal has been detected by the MODEM. The routine can be called as a subroutine after the MODEM signals to the processor that a ring signal is present on the TIP and RING lines 106, 108. The purpose of the routine is to maintain a log of all incoming calls, and to record a voice message if a local phone is not picked up in response to the ring signal. It is assumed for purposes of this description that the computer has already been placed in a voice mail/call logging mode wherein the DTMF SNOOP circuit 120 has been enabled and the MODEM 100 is waiting for a ring signal.

Once a ring has been detected, the processor instructs the MODEM to listen for the caller ID signal via the DTMF SNOOP circuit 130, and the caller ID is then written to storage. This process is illustrated by the process block 204. The caller ID signal is transmitted by the central office between the first and second rings, and identifies the calling party. The processor then reads the contents of the CPC status register 140, as indicated by the process block 210. In the decision block 214, the processor checks the status of the LOCAL PHONE OFF-HOOK bit held by the latch 150.

If the bit is high, indicating that a local phone has already been picked up, the computer records the current time and date to storage as indicated by the process block 244. After recording the time and date, the computer enters into a loop represented by the process block 248 and the decision block 252, wherein the processor reads and tests the LOCAL PHONE OFF-HOOK bit until it returns to zero. Once the LOCAL PHONE OFF-HOOK bit goes to zero, indicating that the phone has been hung up, the time and date are again written to storage, as indicated by the process block 256. The CPC status register is then cleared, as indicated by the process block 240, and the processor exits from the routine.

If the LOCAL PHONE OFF-HOOK bit is low in the decision block 214, the processor instructs the MODEM to go off-hook and begin playing an outgoing voice mail message, as indicated by the process block 218. The processor additionally clears the CPC status register 140 to ensure that the REMOTE HANG UP and LOCAL PICK UP bits in the latches 152, 154 are initially at logic low values. In the decision block 222 the MODEM listens for a facsimile or DTMF control tone, indicating that a facsimile is being sent, or that some other special processing (not shown) is required. Assuming that no such tone is detected, the processor reads the CPC status register 140 and test the REMOTE HANG UP bit held by the latch 152, and the LOCAL PICK UP bit held by the latch 154, as indicated by the process block 226 and decision block 230. If both of these bits are low, the program will remain in a loop wherein the MODEM listens for a control tone and tests the REMOTE HANG UP and LOCAL PICK UP bits. Once one of these bits becomes high, indicating that a local phone has been picked up or the remote phone has been hung up, the processor stops the recording process and takes the MODEM off-hook, as indicated by the process block 234. The processor then clears the CPC status register 140 end exits from the routine.

The record maintained in storage by the program of FIG. 2 indicates the time and duration of incoming calls, as well the identity of the calling party. In addition, the record indicates the identity of callers who hang up without leaving a message, and the identity of callers who leave a voice mail message. The routine can easily be modified to make the answering of the phone by the MODEM contingent upon the caller ID identified in the process block 204. The program would merely compare the caller ID to a list of IDs maintained in storage, and answer or not answer the phone accordingly. Furthermore, the program can be modified to permit one of two or more outgoing messages to be played by the MODEM, with the particular message played depending upon the caller ID identified.

As one skilled in the art would recognize, the status bits held by the latches 150, 152, 154 of the CPC status register 140 can be used for a variety of other call-related functions. For example, during the receipt of a facsimile or data block, the LOCAL PICK UP bit can be sampled. If the bit goes high during the transmission, the MODEM can request that the remote device re-send the data block or otherwise indicate a probable error.

An exemplary call logging/call blocking application for the circuit of FIG. 1 will now be described. The purpose of this application is to maintain a record of outgoing calls in computer memory. The application records the telephone numbers called (from a local phone), the times the calls were placed, and the durations of the calls. The application additionally allows calls to pre-specified numbers to be blocked by the MODEM. The program is in the form of a loop that continuously executes until interrupted.

Figure 3:
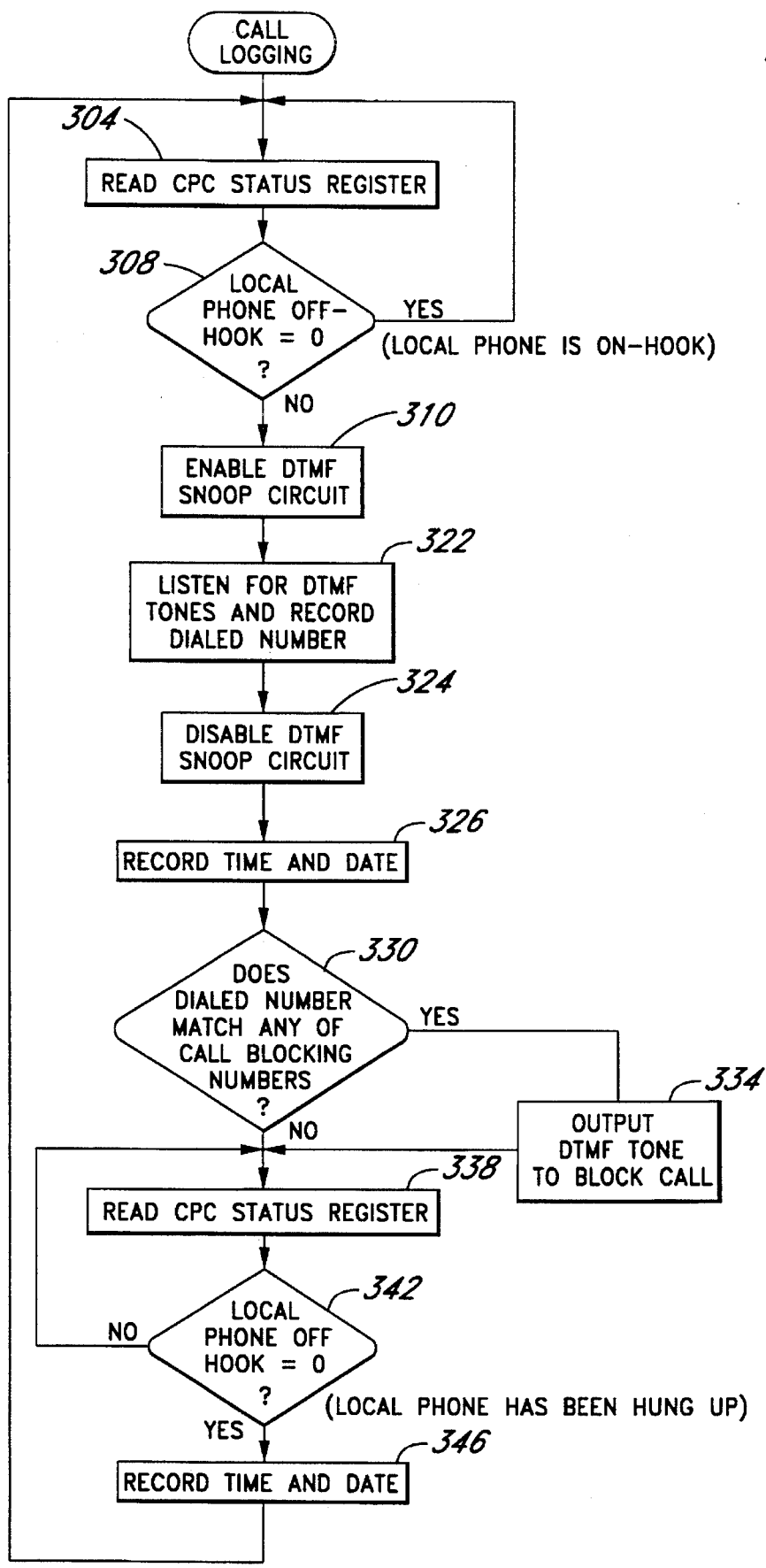
FIG. 3 is a flow chart of an exemplary program showing how the DTMF SNOOP circuit and CPC status bits can be used to perform call logging and call blocking of outgoing calls.

Referring to FIG. 3, the program initially reads and tests the LOCAL PHONE OFF-HOOK bit stored by the latch 150 of the CPC status register 140, as indicated by the process block 304 and the decision block 308. If the bit is low, indicating that all local phones are presently on-hook, the program remains in a loop until a local phone is picked up. Once a local phone has been picked up, the DTMF SNOOP circuit 130 is enabled, as indicated by the process block 310. This is done by activating the DTMF SNOOP ENABLE signal 132 to close the relay 134.

Once the DTMF SNOOP circuit 130 has been enabled the MODEM listens for DTMF tones generated from a local (push button) phone, and the computer stores the phone number represented by the tones. This process is indicated by the process block 322. The computer then disables the DTMF SNOOP circuit by performing an I/O write to a selected address, as indicated by the process block 324. The computer also makes a record of the time and date that the call is placed, as indicated by the process block 326. In the decision block 330 the processor compares the number dialed with a list of phone numbers to be blocked. This list of call blocking numbers is entered by the user prior to executing the program of FIG. 3, and resides on a permanent storage device of the computer. If the dialed number is found to match one of the call blocking numbers, the program branches to the process block 334 wherein a conventional DTMF interruption tone is generated by the MODEM in order to block the outgoing call. If no match is found, or a match is found and the interruption tone has been generated, the program enters into a loop represented by the process block 338 and the decision block 342, and remains in the loop until the LOCAL PHONE OFF-HOOK bit held by the latch 150 goes low. Once the LOCAL PHONE OFF-HOOK bit goes low, indicating that the local phone has been hung up, the time and date are again recorded, as indicated by the process block 346. The program then loops back to the process block 304 to wait for a local phone to go off-hook again.

It should be noted that the MODEM 100 advantageously never goes off-hook during the call logging application described above, with the exception that the MODEM briefly goes off-hook if a call is to be blocked. Additionally, the DTMF SNOOP circuit 130 does not place a significant load on the line when enabled. Thus, the logging operation is transparent to the person or device making or receiving the call being logged.

Now that some of the call-related functions made possible by the circuit of FIG. 1 have been described, exemplary embodiments of the LOCAL PHONE OFF-HOOK detect circuit 110, REMOTE HANG UP/LOCAL PICK UP detect circuit 120, and DTMF SNOOP circuit 130 will be described.

Figure 4:
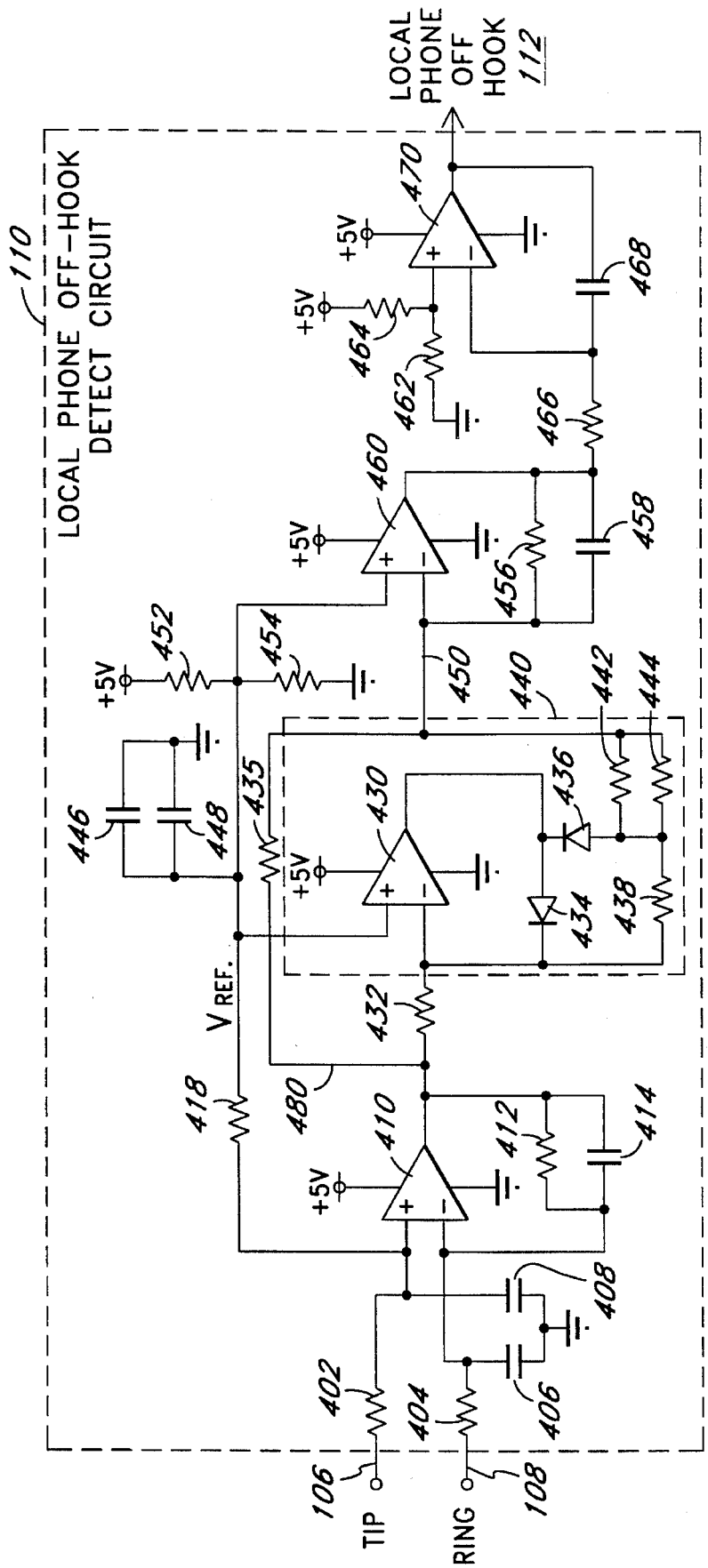
FIG. 4 is a schematic diagram of the LOCAL PHONE OFF-HOOK detect circuit of FIG. 1.

FIG. 4 illustrates the preferred embodiment of the LOCAL PHONE OFF-HOOK detect circuit 110 of FIG. 1. The circuit has four operational amplifiers 410, 430, 460 and 470 (hereinafter "op-amps"). In the preferred embodiment, LM324AD op-amps are used, with rail voltages of +5 volts and ground as shown. The non-inverting input of the first op-amp 410 is connected to the TIP line 106 through a resistor 402, and is coupled to ground by a capacitor 408. The inverting input of the op-amp 410 is connected to the RING line 108 through a resistor 404, and is coupled to ground by a capacitor 406. The feedback path of the op-amp 410 has a resistor 412 in parallel with a capacitor 414. The output of the first op-amp 410 is connected to the inverting input of the second op-amp 430 through a resistor 432. The output of the first op-amp 410 is also connected to the inverting input of the third op-amp 460 through a resistor 435.

The second op-amp 430, together with two diodes 434, 436 and three resistors 438, 442, 444, form a precision rectifier circuit 440 having an output 450.

The non-inverting input of the third op-amp 460 is connected to a voltage divider network comprising two resistors 452, 454. The non-inverting input of the third op-amp 460 is also coupled to ground by two capacitors 446, 448, and is connected to the non-inverting input of the first op-amp 410 through a resistor 418.

The output 450 of the precision rectifier circuit 440 is connected to the inverting input of the third op-amp 460. The third op-amp 460 has a feedback path having a resistor 456 in parallel with a capacitor 458. The output of the third op-amp 460 is connected to the inverting input of the fourth op-amp 470 through a resistor 466. The non-inverting input of the fourth op-amp 470 is connected to a voltage divider network comprising two resistors 462, 464. A capacitor 468 is connected in the feedback path of the fourth op-amp 470. The output of the fourth op-amp is the signal LOCAL PHONE OFF-HOOK on the line 112.

The operation of the circuit 110 will now be described. The circuit determines whether a local phone is off-hook by detecting a change in the voltage differential between the TIP line 106 and the RING line 108 when the local phone switches between the on-hook and off-hook conditions. When the local phone is on-hook, the voltage between the TIP and RING lines (supplied by the central office) is approximately 50 volts DC. However, either of these two lines can have the higher voltage. Thus, the circuit 110 is designed to operate for either $V_{TIP}>V_{RING}$ or $V_{TIP}<V_{RING}$. When a local phone goes off-hook, the voltage difference drops to about 8 volts DC.

The first operational amplifier 410 acts as a comparator for comparing the voltages of the TIP and RING lines 106, 108. The output of the op-amp 410 when the phone goes off-hook depends upon whether $V_{TIP} > V_{RING}$ or $V_{TIP} < V_{RING}$. For $V_{TIP} > V_{RING}$, the non-inverting input of the op-amp 410 is at a higher voltage than the inverting input. Thus, the drop in the voltage between the TIP and RING lines 106, 108 causes the output of the op-amp 410 to drop, producing a high-to-low transition. For $V_{TIP} < V_{RING}$, however, the inverting input is at the higher voltage. Thus, the drop in the voltage between the TIP and RING lines causes the output of the op-amp 410 to increase in voltage, producing a low-to-high transition.

For the circuit to work properly, component values are selected such that when $V_{TIP} > V_{RING}$ the output of the op-amp 410 remains above $V_{REF}$ at all times, where $V_{REF}$ is held approximately constant by the voltage divider network comprising two resistors 452, 454. Similarly, for $V_{TIP} < V_{RING}$ the output of the op-amp 410 always remains below $V_{REF}$.

The precision rectifier circuit 440 converts the transition at the output of the op-amp 410 to a positive-going transition for either $V_{TIP} > V_{RING}$ or $V_{TIP} < V_{RING}$. The non-inverting input of the op-amp 430 is held constant at $V_{REF}$.

When the inverting input of the op-amp 430 is higher than $V_{REF}$ (the situation for $V_{TIP} > V_{RING}$), the output of the op-amp 430 is driven low, and the diode 434 is reverse biased or off. In this situation, the diode 436 is on, and the op-amp 430 is connected as an inverter, producing a low-to-high transition at the output 450 of the precision rectifier circuit 440.

When the inverting input of the op-amp 430 is lower than $V_{REF}$ (the situation when $V_{TIP} < V_{RING}$), the diode 436 is off and the diode 434 is on, allowing feedback current to flow and thereby hold the inverting input of the op-amp 430 at approximately $V_{REF}$. Since no current flows through the diode 436, no current flows through the resistor 435, and the low-to-high output of the first op-amp 410 is reproduced as the output 450 of the precision rectifier circuit 440. Thus, regardless of whether $V_{TIP} > V_{RING}$ or $V_{TIP} < V_{RING}$, a low-to-high transition is produced at the output 450 of the precision rectifier circuit 440 when the local phone goes off-hook.

The third op-amp 460 is connected as a gain inverter, producing an amplified high-to-low transition at its output. The fourth op-amp 470 acts as a comparator, which compares the output of the third op-amp 460 with a reference voltage generated by a voltage divider network comprising the resistor 462 and the resistor 464. Component values are selected such that the high-to-low transition at the output of the third op-amp 460 toggles the output of the comparator, producing a low-to-high transition from 0 volts to 5 volts as the LOCAL PHONE OFF-HOOK output signal on the line 112. This signal can be conditioned using a Schmitt trigger (not shown) before connection to the CPC status register 140. As one skilled in the art will recognize from the preceding discussion, the LOCAL PHONE OFF-HOOK signal will transition from 5 volts to 0 volts when the local phone transitions from off-hook to on-hook for either $V_{TIP} > V_{RING}$ or $V_{TIP} < V_{RING}$.

FIG. 5 illustrates the preferred embodiment of the REMOTE HANG UP/LOCAL PICK UP detect circuit 120 of FIG. 1. The RING and TIP lines 108, 106 are connected as inputs to the circuit after being passed through chokes 502, 504. The signal on the TIP line 106 passes through a capacitor 506, a zener diode 508 and a resistor 510, which form a ringer equivalent circuit 511. The components of the ringer equivalent circuit 511 are selectively by-passed by the off-hook relay 126 which provides a DC current path around the ringer equivalent circuit when the MODEM goes off-hook.

The signals on the RING and TIP lines 108, 106 are then passed through a full-wave bridge rectifier circuit 518 comprising four diodes 520, 522, 524 and 528. The outputs 530, 542 of the full-wave bridge rectifier 518 are coupled by a filter capacitor 532. The first output 530 of the rectifier 518 is also connected to the second output 542 by a resistor 570 and three diodes 572, 574, 576 connected in series as shown. The resistor 570 may have a resistance of, for example, approximately 100 ohms, and, in one preferred embodiment, may be provided by the primary winding of a transformer (not shown). The resistor 570 and the three diodes 572, 574 and 576 are connected in series between the node 577 and the second output 542 of the full-wave bridge rectifier 518, such that current flow is enabled from the first output 530 to the second output 542 through the resistor 570 and the diodes 572, 574 and 576. Thus, the maximum voltage across the three diodes (i.e., between a node 577 and the second output 542 of the full-wave bridge rectifier) is three forward diode voltage drops (e.g., approximately 1.8–2.1 volts).

The first output 530 of the full-wave bridge rectifier 518 is connected to the base of an NPN switching transistor (first transistor) 550 by a first path having a resistor 536, and by a second path having a resistor 538 connected in series with a capacitor 540. The second output 542 of the full-wave bridge rectifier 518 is connected to the base of the first transistor 550 through a diode 534. The base and the collector of the first transistor 550 are coupled by a capacitor 544. The base and emitter of the first transistor 550 are coupled by a capacitor 548.

The base of a PNP transistor (second transistor) 560 is connected to the node 577 through a resistor 554. The base of the second transistor 560 is also connected to the collector of the first transistor 550 through a resistor 552. The emitter of the second transistor 560 is connected directly to the node 577, and is connected to the second output 542 of the full-wave bridge rectifier 518 through a resistor 566.

A first anode input 582 of a first optocoupler 580 is connected to the node 577 via a resistor 578. A second cathode input 584 of the first optocoupler 580 is connected directly to the second output 542 of the full-wave bridge rectifier 518. The first optocoupler 580 has an emitter that is connected to the ground reference. The first optocoupler 580 has a collector output that is connected to the REMOTE HANG UP signal line 122. The REMOTE HANG UP signal line 122 is connected to a clock input of the single-bit latch 152 of the CPC status register 140. (The REMOTE HANG UP signal line 122 is preferably conditioned by a Schmitt trigger circuit (not shown) to generate a smooth TTL switching signal.) The data input of the latch 152 is connected to a 5-volt source.

A first anode input 592 of a second optocoupler 590 is connected to the collector of the second transistor 560 through a resistor 564. The anode input 592 is also coupled to the first output 530 of the full-wave bridge rectifier 518 by a capacitor 562. The second optocoupler 590 has a second cathode input 594 that is connected to the second output 542 of the full-wave bridge rectifier 518. The emitter of the second optocoupler 590 is connected to the ground reference. The collector output of the second optocoupler 590 is the LOCAL PICK UP signal on the line 124. The LOCAL PICK UP signal on the line 124 is connected to the clock input of the single-bit latch 154 of the CPC status register 140. (The LOCAL PICK UP signal line 122 is preferably conditioned by a Schmitt trigger circuit (not shown) to generate a smooth TTL switching signal.) The data input of the latch 154 is connected to a 5-volt source.

The CPC circuit 120 (also referred to as the REMOTE HANG UP/LOCAL PICK UP DETECT CIRCUIT) detects voltage changes on the telephone line caused by a temporary break in the DC current loop resulting from a remote hang up, or voltage changes caused by an impedance change resulting from a local pick up of a telephone or equivalent circuit. Before a DC current loop is established by the local telephone going off-hook, no DC current path is provided through the ringer equivalent circuit 511 and the full-wave bridge rectifier 518, and thus no output voltage is provided between the first output 530 and the second output 542. When the modem goes off-hook, the off-hook relay 126 closes to by-pass the ringer equivalent circuit 511 and thus provide a DC current path to the full-wave bridge rectifier 518. When only the MODEM goes off-hook, the voltage across the full-wave bridge rectifier 518 is relatively high (e.g., approximately 8 volts), causing the capacitor 540 to be fully charged and causing the voltage on the base of the first transistor 550 to be approximately 0.65 volts (i.e., one base-emitter forward voltage drop). This causes the first transistor 550 to be fully on such that the collector of the first transistor 550 is substantially at the voltage of the second output 542 of the full-wave bridge rectifier 518. This causes the base of the second transistor 560 to be pulled low such that the second transistor 560 is turned on to permit current to flow through the inputs of the second optocoupler 590. The collector of the second optocoupler 590 is thus pulled low to hold the LOCAL PICK UP signal line 124 low.

When the local telephone goes off-hook to establish its DC current loop, the voltage across the full-wave bridge rectifier 518 drops because of the two impedances in parallel, thus dropping the voltage between the first output 530 and the second output 542 of the full-wave bridge rectifier 518 to approximately 4 volts. The voltage across the capacitor 540 cannot change instantaneously. Thus, the voltage on the base of the first transistor 550 is initially pulled low to turn off the first transistor 550 for approximately 1.9 milliseconds. This allows the voltage on the base of the second transistor 560 to rise to turn off the second transistor 560 for approximately the same time duration. When the second transistor 560 turns off, the collector current to the input of the second optocoupler 590 is blocked, thus turning off the second optocoupler 590. The collector of the second optocoupler 590 is thus pulled high by the pullup resistor 596 to cause a low-to-high transition in the LOCAL PICKUP signal on the line 124. This low-to-high transition is coupled through the Schmitt trigger (not shown) to clock the single-bit latch 154 of the CPC status register 140 to indicate that the local telephone has gone off-hook. The latch 154 can be read by the microprocessor (not shown) via the I/O port 160, and remains active until cleared by the microprocessor (not shown) via the CLR signal on the line 142 from the I/O port 160.

The central office normally maintains a current source on the subscriber line so that when the local telephone is on-hook, a relatively large voltage (e.g., approximately 50 volts) is maintained between the RING and TIP lines 108, 106, and so that when the local telephone is off-hook, a relatively small voltage (e.g., approximately 8 volts) is maintained between the two lines. When the remote party first hangs up, the central office temporarily disconnects the current source for approximately 250 milliseconds so that no voltage is present across the two lines. When either the on-hook voltage or the off-hook voltage is across the lines, the voltage on the node 577 across the three series connected diodes 572, 574, 576 is sufficient to keep the first optocoupler 580 conducting so that the REMOTE HANG UP signal on the line 122 is held low. During the 250 milliseconds that the central office disconnects the current loop, the first optocoupler 580 stops conducting so that the REMOTE HANG UP signal on the line 122 is pulled up by the pullup resistor 596. This low-to-high transition is conditioned by the Schmitt trigger circuit (not shown) and clocks the latch 152 of the CPC status register 140. The state of the REMOTE HANG UP status bit can be read via the I/O port 160 and subsequently cleared via the CLR signal on the line 142.

Figure 6:
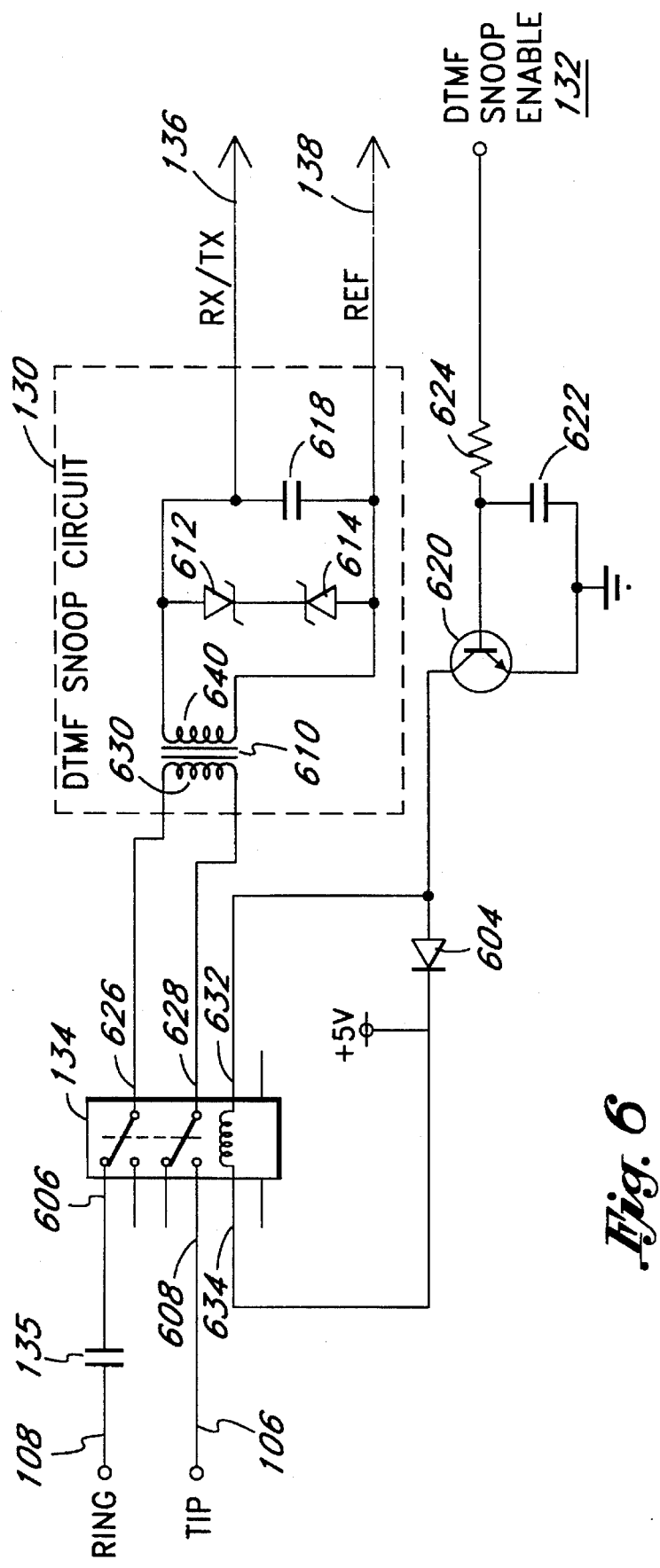
FIG. 6 is a schematic diagram of the DTMF SNOOP circuit and corresponding relay of FIG. 1.

FIG. 6 illustrates the DTMF SNOOP circuit 130 of FIG. 1 and the relay 134 for enabling the DTMF SNOOP circuit 130. The RING line 108 is connected to one input 606 of the relay 134 by a capacitor 135. The TIP line 106 is connected directly to a second input 608 of the relay 134. The outputs 626, 628 of the relay are connected across the primary winding 630 of a transformer 610.

The secondary winding 640 of the transformer 610 is connected in parallel with a series combination of two zener diodes 612, 614 having connected cathodes as shown. The secondary winding 640 is also connected in parallel with a capacitor 618. The voltage across this parallel combination of the secondary winding 640, zener diodes 612, 614, and capacitor 618 forms the RX/TX signal on the line 136 relative the VREF voltage reference on the line 138.

The circuit for controlling the relay 134 comprises an NPN transistor 620, a resistor 624, a capacitor 622 and a diode 604. The DTMF SNOOP ENABLE signal 132 is applied to the base of the transistor 620 through the resistor 624. The base of the transistor 620 is coupled to ground by a capacitor 622. The emitter of the transistor 620 is connected to ground. The collector of the transistor 620 is connected to one control input 632 of the relay 134. A second control input 634 of the relay 134 is connected to a 5-volt source. The two control inputs 632, 634 of the relay 134 are connected by the diode 604.

The operation of the DTMF SNOOP circuit 130 and relay 134 will now be described. When the DTMF SNOOP ENABLE signal 132 is driven high, the capacitor 622 charges and the transistor 620 turns on. A current path is thus established from the 5-volt source to ground through the relay 134 and transistor 620, switching the relay 134 to pass the signal on the RING and TIP lines 108, 106 across the primary winding 630 of the transformer 610.

The capacitor 135 prevents DC current from flowing into the primary winding 630. The DTMF SNOOP circuit 130 thus becomes AC coupled to the phone line. Since conventional DTMF signals are in the form of AC tones (falling in the audio range), the DTMF signals that are present when a number is dialed from a push-button local phone appear across the primary winding 630 of the transformer 610. The AC signal appearing across the primary winding 630 is reproduced across the secondary winding 640 as the RX/TX signal on the line 136 relative to the REF voltage reference on the line 138. The zener diode combination 612, 614 prevents the voltage across the secondary winding 640 from exceeding a peak of approximately 4 volts. The capacitor 618 serves to filter out unwanted high-frequency components. The RX/TX signal line 136 and REF voltage reference line 138 are then connected to a standard MODEM chip-set for decoding conventional DTMF tones.

Advantageously, the transformer 610 does not place a significant load on the phone line. Thus, when enabled, the DTMF SNOOP circuit 130 does not interfere with the normal operation of the phone line, and is transparent to users of the local phone.

When the DTMF SNOOP ENABLE signal 132 is driven low, the transistor 620 turns off, opening the relay 134 and thus disabling the DTMF SNOOP circuit 130.

The circuits and methods described above for controlling voice mail, call logging and call blocking functions using a MODEM have been presented by way of example only, and not limitation. Thus, the breadth and scope of the present invention should not be limited by any of the above-described exemplary embodiments, but should be defined only in accordance with the following claims and their equivalents.

What is claimed is:

1. A telephone line monitoring circuit for a computer, said monitoring circuit comprising:
   a MODEM, said modem including
      a first input connected to a TIP line of a telephone line;
      a second input connected to a RING line of said telephone line;
      a first circuit that detects when a local phone goes off-hook while said MODEM is on-hook by sensing a decrease in a differential voltage between said TIP line and said RING line occurring when said local phone goes off-hook, said first circuit providing a local off-hook output signal responsive to said decrease in said differential voltage; and
      a snoop circuit that monitors said telephone line for DTMF signals while said MODEM is on-hook, said snoop circuit being AC coupled to said telephone line such that no DC load is placed on the telephone line, said snoop circuit providing an output signal representing said DTMF signals on said telephone line.

2. The telephone line monitoring circuit of claim 1, further comprising a second circuit that detects a local pick up while said MODEM is off-hook by sensing a change in an impedance between said TIP line and said RING line occurring when a local phone goes off-hook while said MODEM is off-hook, said second circuit providing a local pick up output signal responsive to said change in impedance.

3. The telephone line monitoring circuit of claim 1, further comprising a third circuit that detects a remote hang up when said MODEM is off-hook by sensing a decrease in said differential voltage to substantially zero occurring when a central office temporarily turns off a DC current loop to said MODEM in response to said remote hang up, said third circuit providing a remote hang up output signal responsive to said decrease in said differential voltage to substantially zero.

4. A snoop circuit for a MODEM that monitors a telephone line for DTMF signals without putting a DC load on said telephone line, and that generates an output signal representative of said DTMF signals on said telephone line, comprising:
   a first input connected to a TIP line of said telephone line;
   a second input connected to a RING line of said telephone line;
   a DC current blocking element for preventing a DC current from flowing through said first input and said second input, said current limiting element thereby allowing said MODEM to monitor said telephone line while on-hook; and
   means for reproducing said DTMF signals on said telephone line as said output signal.

5. The snoop circuit of claim 4, wherein said means for reproducing said DTMF signals on said telephone line as said output signal comprises a transformer.

6. A method of using a MODEM having a snoop circuit to monitor a telephone line while said MODEM is on-hook, and to record information regarding incoming and outgoing calls monitored by said snoop circuit, said telephone line having a TIP line and a RING line, said method comprising the steps of:
   detecting a ring signal on said TIP line and said RING line of said telephone line;
   detecting a caller ID signal transmitted on said TIP line and said RING line during said ring signal using said snoop circuit;
   decoding said caller ID signal to produce a telephone number that represents an incoming call;
   recording said telephone number that represents said incoming call;
   recording a time indicating when said incoming call was received;
   detecting when a local phone is off-hook by sensing a voltage drop occurring across said TIP line and said RING line when said local phone goes off-hook;
   monitoring said TIP and said RING line using said snoop circuit while said local phone is off-hook to obtain a telephone number that represents an outgoing call;
   recording said telephone number that represents said outgoing call; and
   recording a time indicating when said outgoing call was placed.

7. The method according to claim 6, further comprising the step of blocking said outgoing call when said telephone number that represents said outgoing call matches a predetermined telephone number.

8. The method according to claim 7, wherein said step of blocking comprises the step of transmitting a blocking signal on said telephone line.

9. A telephone line monitoring circuit for a MODEM, said monitoring circuit comprising:
   a first input connected to a TIP line of a telephone line;
   a second input connected to a RING line of said telephone line;
   a first circuit that detects when a local phone goes off-hook while said MODEM is on-hook by sensing a decrease in a differential voltage between said TIP line and said RING line occurring when said local phone goes off-hook, said first circuit providing a local off-hook output signal responsive to said decrease in said differential voltage;
   a second circuit that detects a local pick up while said MODEM is off-hook by sensing a change in an impedance between said TIP line and said RING line occurring when a local phone goes off-hook while said MODEM is off-hook, said second circuit providing a local pick up output signal responsive to said local pick up;
   a third circuit for detecting a remote hang up when said MODEM is off-hook by sensing a decrease in said differential voltage to substantially zero occurring when a central office temporarily turns off a DC current loop to said MODEM in response to said remote hang up, said second circuit providing a remote hang up output signal responsive to said remote hang up; and
   a snoop circuit that monitors said telephone line for DTMF signals while said MODEM is on-hook, said snoop circuit being AC coupled to said telephone line such that no DC load is placed on the telephone line, said snoop circuit providing an output signal representing said DTMF signals on said telephone line.

10. The telephone line monitoring circuit of claim 9, further comprising a register connected to said first circuit, said second circuit and said third circuit, said register storing data bits indicative of the status of said local off-hook output signal, said local pick up output signal, and said remote hang up output signal.

11. A telephone line monitoring system for allowing a computer to monitor both incoming and outgoing telephone calls without going off-hook, and to generate a record of the incoming and the outgoing telephone calls, comprising:

a MODEM connected to said computer;

a snoop circuit on said MODEM and connected to a telephone line, said snoop circuit providing an output signal representing signals on said telephone line, said output signal provided to decoding circuitry of said MODEM, said snoop circuit including coupling circuitry for preventing a DC load from being placed on said telephone line, said coupling circuitry thereby allowing said MODEM to monitor said telephone line while on-hook; and a software module which runs on said computer, said software module configured to, while said MODEM is on-hook, do each of: (a) monitor an on-hook/off-hook status of a local phone, and (b) when said local phone is off-hook, record a telephone number of an outgoing call placed from said local phone, said telephone number captured via said snoop circuit.

12. The telephone line monitoring system according to claim 11, wherein said software module is further configured to:

(c) block said outgoing call when said telephone number of said outgoing call matches a predetermined telephone number.

13. A method of using a MODEM to selectively block calls placed from a local phone, said MODEM and said local phone connected to a common telephone line, said method comprising the steps of:

detecting when said local phone is off hook;

monitoring tones on said telephone line while said local phone is off hook to detect a telephone number of an outgoing call placed from said local phone, said step of monitoring performed without placing a DC load on said telephone line so that said MODEM remains on hook;

comparing said telephone number to at least one predetermined number; and blocking said outgoing call when said telephone number matches said predetermined number.

14. The method according to claim 13, wherein said step of blocking comprises the step of transmitting a blocking signal on said telephone line.

\* \* \* \* \*